UNITED STATES PATENT OFFICE.

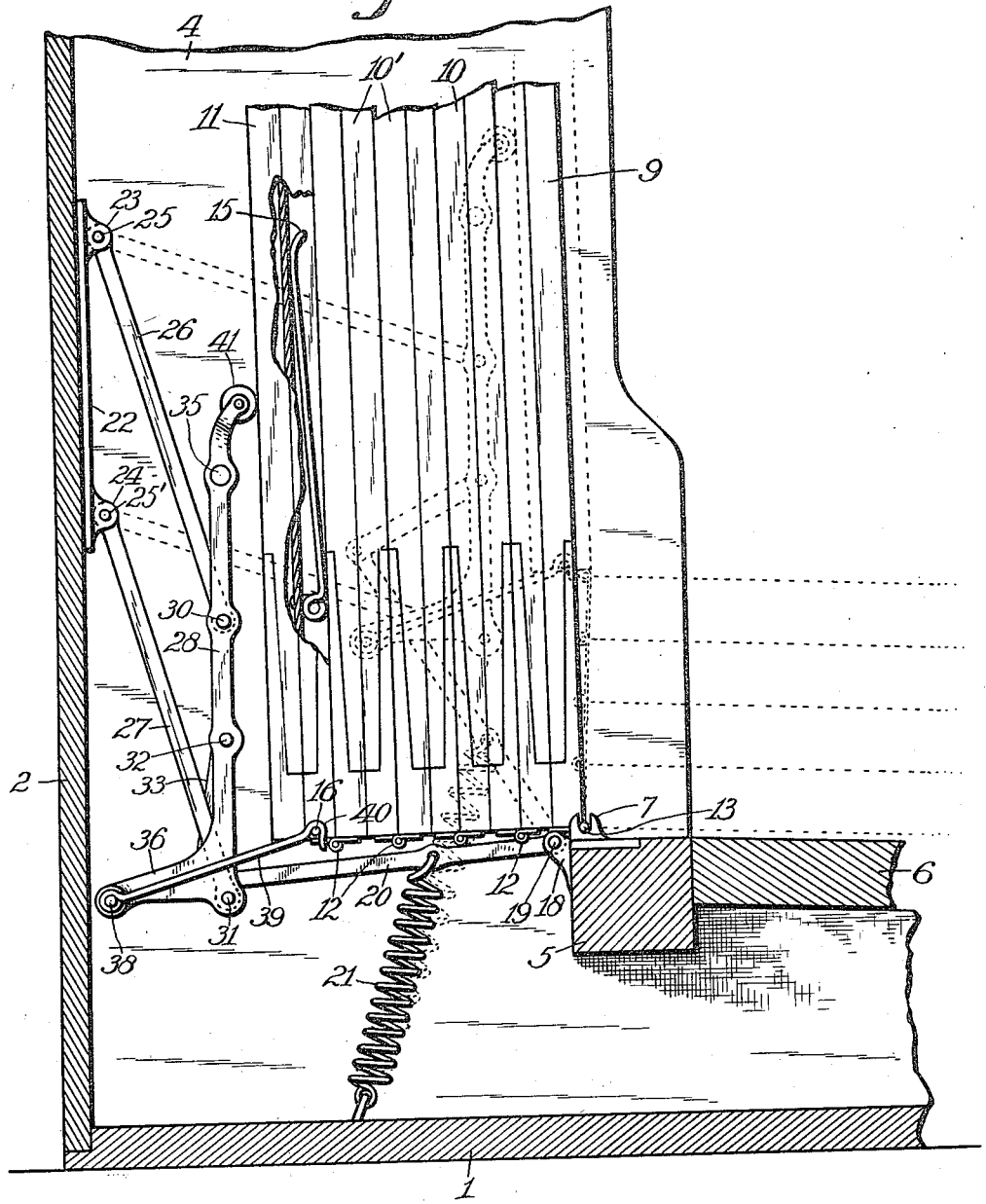

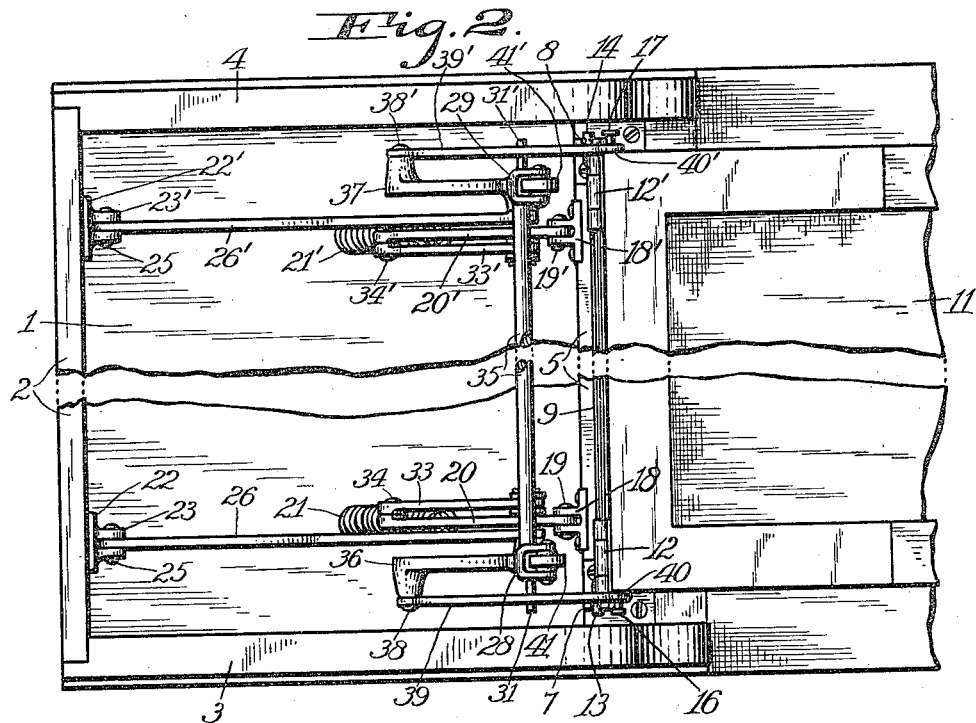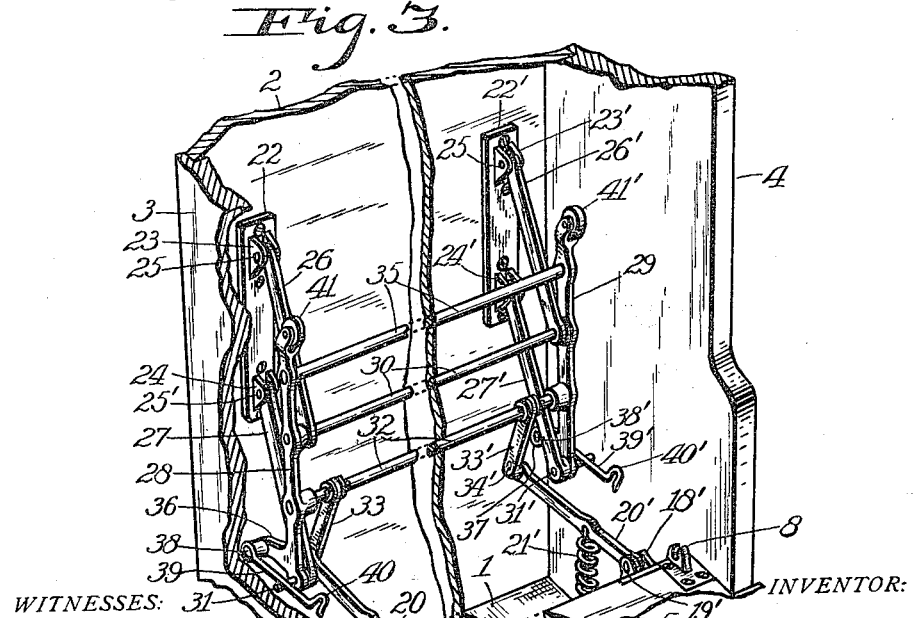

ELLIS T. SILVIUS, OF INDIANAPOLIS, INDIANA, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,154,135.   Specification of Letters Patent.   Patented Sept. 21, 1915.

Application filed December 26, 1912. Serial No. 738,730.

*To all whom it may concern:*

Be it known that I, ELLIS T. SILVIUS, a citizen of the United States, residing at Indianapolis, in the county of Marion and State of Indiana, have invented a new and useful Improvement in Filing Appliances, of which the following is a specification, reference being had to the accompanying drawings and to the letters and figures of reference marked thereon.

This invention relates to the class of filing appliances that comprises a plurality of filing leaves or frames for holding papers and pivotally or hingedly connected together and normally standing in upright position, one of the leaves being pivotally supported so as to guide and control the movement of that and the remaining leaves or frames, the invention having reference more particularly to equalizing or paralleling apparatus whereby when one or a number of the leaves are moved to prone position the remaining upright leaves are maintained in substantially vertical position as they are moved forward by the operated leaves.

An object of the invention is to provide improved apparatus of the above mentioned character of such construction as to be adapted to be cheaply produced and be reliably and practically noiseless in operation.

A further object is to provide equalizing or paralleling apparatus for filing or credit account register that shall be adapted more especially for use in filing cabinets with relatively few filing leaves or frames of either small or relatively large dimensions.

A still further object is to provide apparatus of the above mentioned character of such construction as to be especially adapted for use with filing leaves or frames that are directly hinged together as a rectangular pack.

With the above mentioned and other objects in view, the invention comprises a supporting case or stand in which filing leaves or frames are mounted, and an improved abutment or follower mounted on the back of the case or stand and adapted to be connected to one of the leaves or frames for preventing the leaves or frames from tilting rearward from upright position.

The invention consists also in the parts and combinations and arrangements of parts as hereinafter particularly described and further defined in the accompanying claims.

Referring to the drawings, Figure 1 is a side elevation of a set of filing leaves or frames of well known or suitable construction together with the improved equalizing or paralleling apparatus mounted in a case of common form, the leaves or frames and the case being partially broken away; Fig. 2, a top plan of the case and contents thereof partially broken away, the leaves or frames being in prone position; and Fig. 3, a fragmentary perspective view of the supporting case or stand and the equalizing or paralleling apparatus mounted therein.

Similar reference characters in the different figures of the drawings indicate corresponding elements or features of construction herein referred to.

The case or stand may be variously constructed and suitably comprises a bottom 1 on which is an upright back 2 and preferable two sides 3 and 4. A base rail or leaf support 5 is fixedly supported at a suitable distance forward of the back 2 and above the bottom 1, preferably by means of the sides of the case, a desk top 6 extending forward from the rail 5 for supporting the leaves in prone position. The top of the rail 5 is provided with a plurality of pivot stands 7 and 8. A suitable number of leaves or frames which may all be substantially alike are employed, there being a front leaf 9, intermediate leaves 10, 10', and a rear leaf 11 arranged face to face and as illustrated are connected together by means of hinges 12 in a well known manner, it being preferable that each two adjacent leaves or frame be connected together by two hinges. The normal lower forward portion of the front leaf 9 is provided with two pivots 13 and 14 that are removably mounted in the two stands 7 and 8 respectively. Each leaf or frame is provided with a suitable number of bill holding devices or clamps 15 for removably securing papers in systematic order on the leaves. The normal lower portion of the rear leaf 11 is provided with two pivots 16 and 17 on opposite side portions thereof and these may be variously arranged and connected relative to the axis of the hinge pin that connects the leaf with the adjacent leaf but preferably is arranged conveniently close to the hinge pin. In some cases one of the pivots 16 or 17 may be omitted.

Preferably two jaws 18 and 18' are provided and secured to the rearward portion of the rail or support 5 and are provided with pivots 19 and 19' respectively to which one end of two levers 20 and 20' are respectively connected, the levers normally extending toward the back 2, and they gravitate downward and are drawn downward preferably by means of two coil springs 21 and 21' connected thereto respectively and suitably supported or anchored, as on the bottom 1. In some cases, especially with relatively small leaves or frames, one of the levers may be dispensed with, and with relatively few leaves, both levers may be omitted if desired, it being preferable, however, that at least one lever and a spring be employed for assisting the operator in moving the leaves upward from prone position.

A practical embodiment of the invention preferably comprises two base plates 22 and 22' of suitable length which are secured in vertical arrangement, each parallel to the other on the inner side of the back 2 so as to be behind the rear filing leaf or frame. One base plate is provided on its upper portion with pivot ears 23 and similar ears 24 on its lower portion, the companion plate having pivot ears 23' on its upper portion and similar ears 24' on its lower portion. The upper and lower ears are provided respectively with pivots 25 and 25'. Two stiff links 26 and 27 are connected at one end to the pivots of the ears 23 and 24 respectively and two similar links 26' and 27' are respectively connected at one end to the pivots of the ears 23' and 24', all the links being of equal length. The abutment or follower comprises two bars 28 and 29 that are connected to a tie-rod 30 which constitutes a pivot that is connected with the two links 26 and 26'. The links 27 and 27' are connected with the lower portions of the bars 28 and 29 respectively by means of pivots 31 and 31'. The distance between the pivotal rod 30 and the pivot 31 is equal to the distance between the pivots 25 and 25' so that the links 26 and 27 are parallel each to the other, and abutment being maintained by the links parallel with the back of the case. A pivotal tie-rod 32 is connected to the two bars 28 and 29 and is in pivotal connection with two links 33 and 33' that are provided with pivots 34 and 34' respectively whereby the links are connected with the rearward portions of the levers 20 and 20' respectively. Preferably a tie bar 35 is secured to the upper portions of the two bars 28 and 29. The lower portions of the bars 28 and 29 have rearward extensions 36 and 37 thereon respectively that serve to weight the bars, and they are provided with pivots 38 and 38' respectively whereby two stiff links 39 and 39' are connected respectively to the two extensions, the links extending forward beyond the abutment, and they are provided respectively with hooks 40 and 40' that are detachably connected with the pivots 16 and 17, so that the abutment is connected with the rear leaf and may move up or down relatively to the leaf during pivotal movement of the leaves. The upper portions of the abutment bars 28 and 29 are preferably provided with rollers 41 and 41' respectively against which the rear leaf is supported and prevented from tilting backward. The links 39 and 39' may be designed to couple the abutment more or less closely to the rear leaf as may be desired, so that the leaves may be caused to either lean slightly rearward or to be perpendicular.

It is evident that in some cases one abutment bar and its supporting links and connections may if desired be dispensed with although both may be desired in connection with the larger sizes of leaves or frames. It is apparent also that the filing leaves or frames may be variously connected together so as to permit pivotal movement of all of the leaves on the pivot stands and also relatively each to the other.

In practical use, the leaves are moved forward from normal upright position to prone position, one or more at a time in order to place papers thereon or remove them or to inspect the papers, four of the five leaves illustrated being shown by dotted lines in prone position in Fig. 1 and supporting the remaining leaf in upright position, the upright leaf being prevented from tilting backward by the equalizing apparatus which is shown by dotted lines in the required position and it will be seen that the tendency of the gravitating abutment and the spring or springs is to pull backward on the rear leaf so as to assist in raising the prone leaves. When the leaves or frames are moved pivotally the equalizing apparatus moves quietly therewith and stops the leaves when they arrive at their normal upright position without jar or noise, as will be readily understood, and they are inclined by the force of gravity to lean against the abutment and therefore will not fall forwardly. When the abutment bars are drawn forward it is evident that they are also drawn upward by the rear leaf and are forced forward also by their supporting links which are carried upward to extended position, the abutment bars therefore being always parallel to the back of the case or stand.

Having thus described the invention, what is claimed as new is:—

1. A filing appliance equalizer including a case, two links pivoted to the case, an abutment bar pivotally connected to the two links, a coupling link pivoted to the bar, a lever pivoted to the case, and a link pivoted to the lever and to the bar.

2. A filing appliance equalizer including a supporting plate, an abutment bar, two links pivotally connected to the plate and also to the bar at points equi-distant apart, a roller mounted on one end portion of the bar, and a coupling link mounted on the opposite end portion of the bar.

3. A filing appliance including a case comprising an upright back, a plurality of filing leaves hingedly connected together and pivotally supported forward of the back, and a plurality of links pivotally supported on the back and having an abutment bar connected thereto and guided thereby parallel to the back, the bar being normally retained in shifting contact with the rearmost one of the leaves.

4. A filing appliance including an upright support, an abutment bar mounted uprightly on the support to move parallel thereto and from or toward the support, a plurality of filing leaves connected together and pivotally supported to stand uprightly against the abutment bar, and a link for connecting the bar with the lower end of one of the leaves.

5. A filing appliance including a case comprising an upright back provided with an upright movable parallel abutment, and a plurality of filing leaves connected together for relative pivotal movement, the forward one being pivotally supported in the case forward of the back, the rearward one of the leaves being connected at its lower end with and slidably engaging the abutment.

6. A filing appliance including a case comprising an upright back, a plurality of filing leaves connected together for relative pivotal movement and pivotally supported opposite to the back, a vertically extending abutment behind the leaves, means mounted on the back of the case for movably supporting the abutment parallel to the back and a link for connecting the abutment to one of the leaves.

7. A filing appliance including a case comprising an upright back, two links pivotally supported one below the other on the back, an abutment bar having two portions pivotally connected with the two links respectively and maintaining the links in parallel order each to the other, the links maintaining the bar parallel to the back, and means for connecting the bar with one of a plurality of connected filing leaves pivotally supported opposite to the back.

8. In a filing appliance, the combination of a plurality of normally upright filing leaves hingedly connected together, and means for pivotally supporting the forward one of the leaves, with an abutment having relatively movable connection with the rear one of the leaves and extending upward to support the back of the leaf, and means for swingingly supporting the abutment under control behind and in slidable contact with the rear leaf.

9. In a filing appliance, the combination with a case having an upright back, and a plurality of filing leaves hingedly connected one to another in normal upright position, the foremost one being pivotally supported in the case forward of the back, the rearmost one of the leaves having a pivot thereon, of a plurality of links spaced apart and pivoted one below the other to the back, an abutment bar pivotally connected to the two links, and means for connecting the bar with the pivot.

10. In a filing appliance, the combination with a case, and two links arranged one below the other and pivotally supported by the case, of an abutment bar pivotally connected at two portions one below the other to the two links respectively, a plurality of filing leaves connected together for relative pivotal movement, means for pivotally supporting the foremost one of the leaves in the case and means for connecting the rearmost one of the leaves with the abutment bar.

11. In a filing appliance, the combination with an upright supporting back, a plurality of filing leaves uprightly supported to move pivotally away from the supporting back, an abutment uprightly arranged behind the rear one of the leaves in movable contact therewith, and means for connecting the lower portion of the rear leaf with the abutment, of a plurality of links arranged in parallel order one below the other and pivotally connected to the back and also to the abutment and guiding the abutment upward and away from the back parallel thereto.

12. In a filing appliance, the combination of a case comprising a base and an upright back, the back having two pivots thereon in one horizontal plane and also two other pivots in a lower horizontal plane, two links connected respectively to the two uppermost pivots, two links connected respectively to the two lowermost pivots, an abutment connected to all of said links, a plurality of filing leaves hingedly connected one to another and normally arranged uprightly, the forward one being pivotally supported on said base, and means for connecting the abutment with the rearmost one of the leaves.

13. In a filing appliance, the combination with an upright support, a plurality of filing leaves uprightly arranged forward of the support, and means for pivotally supporting the leaves to enable them to move pivotally to prone superimposed position, of an uprightly arranged abutment connected with the normal lower portion of the rear one of the leaves to permit relative upward or downward movement, and a plurality of links arranged one below the other and pivotally connected to the support and also to the abutment for supporting and guiding the abutment parallel to the support and in contact with the rear one of the leaves.

14. In a filing appliance, the combination of a case, a plurality of filing leaves normally arranged uprightly in the case, means for pivotally supporting and connecting the leaves one to another, two links pivotally connected one below the other to the case, an abutment bar having two portions thereof pivotally connected respectively to the two links, a coupling link pivotally connected to the abutment bar and to the rearmost one of the leaves, a lever pivotally connected to the case, a link pivotally connected to the lever and to the abutment bar, and a spring connected to the lever and to the case.

15. In a filing appliance, the combination of a case having a back provided with a plurality of pivots spaced apart, one below the other, an abutment bar having a plurality of pivots spaced apart equal to the space between the pivots of the back, a plurality of links connected respectively to the pivots of the back and also to the pivots of the bar, one link being below the other, and a supported spring for yieldingly drawing the abutment downward and toward the back, with a plurality of filing leaves hingedly connected together and uprightly supported to move pivotally to prone position, the rear one being connected with and standing against the abutment bar.

In testimony whereof, I affix my signature in presence of two witnesses.

ELLIS T. SILVIUS.

Witnesses:
 J. H. GARDNER,
 B. F. WATSON.

Copies of this patent may be obtained for five cents each, by addressing the "Commissioner of Patents, Washington, D. C."